INVENTOR.
JOEL T. ABBOTT,
BY
Knight & Rodgers
ATTORNEYS.

INVENTOR.
JOEL T. ABBOTT,
BY
Knight & Rodgers
ATTORNEYS.

Jan. 4, 1955 J. T. ABBOTT 2,698,877

AUTOMATIC TELEPHONE ANSWERING SYSTEM

Filed June 28, 1949 4 Sheets-Sheet 3

INVENTOR.
JOEL T. ABBOTT,
BY
Knight & Rodgers
ATTORNEYS.

AUTOMATIC TELEPHONE ANSWERING SYSTEM

Filed June 28, 1949

4 Sheets-Sheet 4

INVENTOR.
JOEL T. ABBOTT,
BY
Knight & Rodgers
ATTORNEYS.

2,698,877

AUTOMATIC TELEPHONE ANSWERING SYSTEM

Joel T. Abbott, Culver City, Calif., assignor to George S. Koester, Los Angeles, Calif.

Application June 28, 1949, Serial No. 101,722

15 Claims. (Cl. 179—6)

The present device relates generally to sound recording and reproducing systems; and more particularly to those which are adapted to be connected to a telephone circuit in order to provide means for automatically answering an incoming telephone call by repeating a recorded announcement and then recording a message.

Various attempts have been made to devise an apparatus for answering an incoming telephone call and for recording a brief message from the party calling. A system of this type serves various useful purposes, but is particularly valuable since it allows the party making the call to complete it even though the telephone called is unattended. This situation facilitates communications over telephones and thereby makes the telephone of greater value to the users.

Another particular use of a system of this type is to increase the capacity of a certain piece of equipment to handle incoming telephone calls. For example, a local exchange may have a temporary condition of over-flow traffic because there are suddenly more incoming calls than the board operator can handle. These excess calls can be switched onto an automatic recording system so that the party calling could leave a brief message or make an inquiry, and then when traffic over the board permits, the operator can call back the party. A reply can be made when the call is returned, even though it may take some time to answer the question or gather the information for the party inquiring, without the necessity of making an intervening telephone call or of the party calling making repeated calls which produce a feeling of annoyance and frustration when a busy signal is obtained time and again. Thus recording of the incoming calls would save considerable time for both the party calling and the party called. A worthwhile, but intangible benefit, is the good will which would be built up for a business concern which would provide a service of this type for its customers.

In general, an automatic telephone answering and recording system would serve to speed up communications between different parties, improve and increase the usefulness of specific telephone equipment, save time for all parties concerned, and level out peak loads of incoming calls so that personnel required to handle them can be reduced.

Known types of devices attempting to solve this problem have had various objections, among which are that the devices are too large and bulky, that they are too complex to be reasonably economical, and in many cases have not been sufficiently reliable to be attractive to telephone users. Some of these objections have arisen from the fact that satisfactory apparatus has not been commercially available and consequently must be specially built and designed for this particular use, but this condition is being remedied to some extent at least at the present time because of the wide range of different pieces of electrical equipment now available on the open market. Another and more serious reason for the costliness of known receivers of this type has been the inherent complexity of the circuits and the component parts. Persons developing these systems have either been unwilling or unable to simplify the circuits sufficiently that they could be manufactured economically and reliably.

A currently existing condition of which advantage may be taken is the relatively common use of recording machines of various types in business offices, these machines being especially suited for voice recording and taking dictation. These machines may record on wire, wax or synthetic resin records, film, metal or metallized tape, or various other media. Since these recording machines are not in use all the time, they are frequently available for incorporation into a telephone answering system, thereby extending the usefulness of such recording devices.

Therefore it becomes a general object of my invention to provide an attachment for a sound recording device which may be connected to a telephone circuit and to the recording device to cooperate with the latter in producing an automatic telephone answering system that issues an announcement and records a message.

It is also a general object of my invention to provide an attachment of this character that can be quickly and easily placed in operation when it is desired to provide for automatic telephone answering, and which may be quickly and easily rendered inoperable when it is desired to use the recording unit for dictation or other recording purposes.

It is a further object of my invention to provide an automatic telephone answering system which is simple in construction and operation, making the system reliable in operation and easy to maintain.

It is also an object of my invention to provide a telephone answering system which is entirely automatic in operation and which will reproduce an announcement over the wire before it records an incoming message.

A further object of my invention is to devise an attachment of this character which makes a maximum use of standard component parts commercially available, thus reducing to a minimum the special parts required and also the cost of manufacturing the attachment.

A further object is to provide a system that will answer each of a succession of telephone calls, by automatically reproducing and transmitting over the telephone a recorded message or announcement and thereafter automatically receiving and recording an incoming telephone message, in response to each successive call. In this connection, a particular object is to provide such a system which will operate promptly and automatically in response to each incoming call, to reproduce and transmit the recorded announcement and therefore receive and record the incoming message, and which will then automatically terminate operation of the system and restore it to condition for answering another incoming call. Since the mechanism employed is operated only the period of time required to answer a call and record a message, the consumption of power and wear on the mechanism are reduced to a minimum.

How the above and other objects and advantages of my invention, as well as others not specifically mentioned herein, are attained, will be more readily apparent by reference to the following specification and to the annexed drawings, in which.

Figure 1:
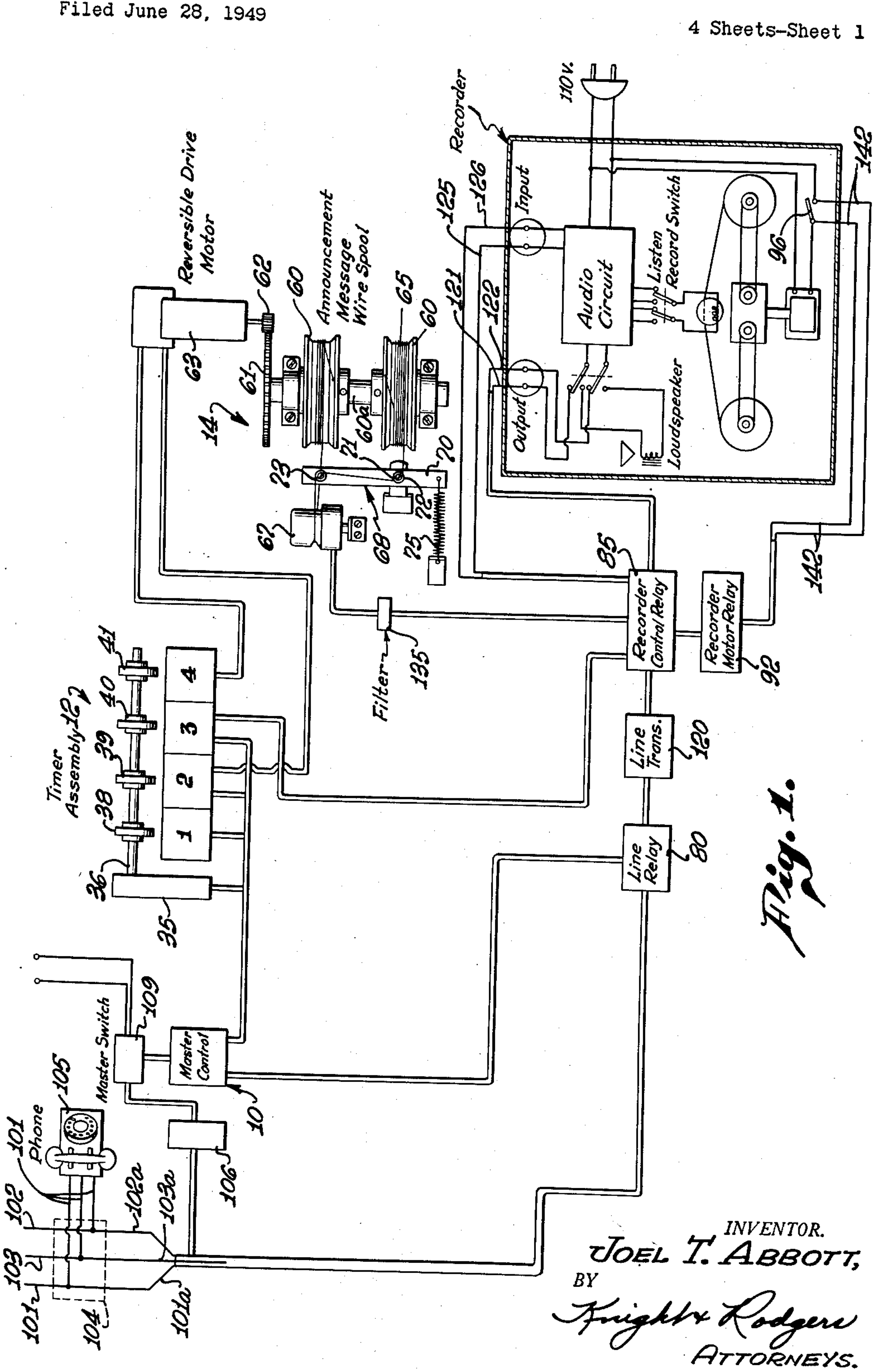
Fig. 1 is a block or schematic diagram of my entire telephone answering and recording system, including a recording unit of conventional design.
Figure 2:
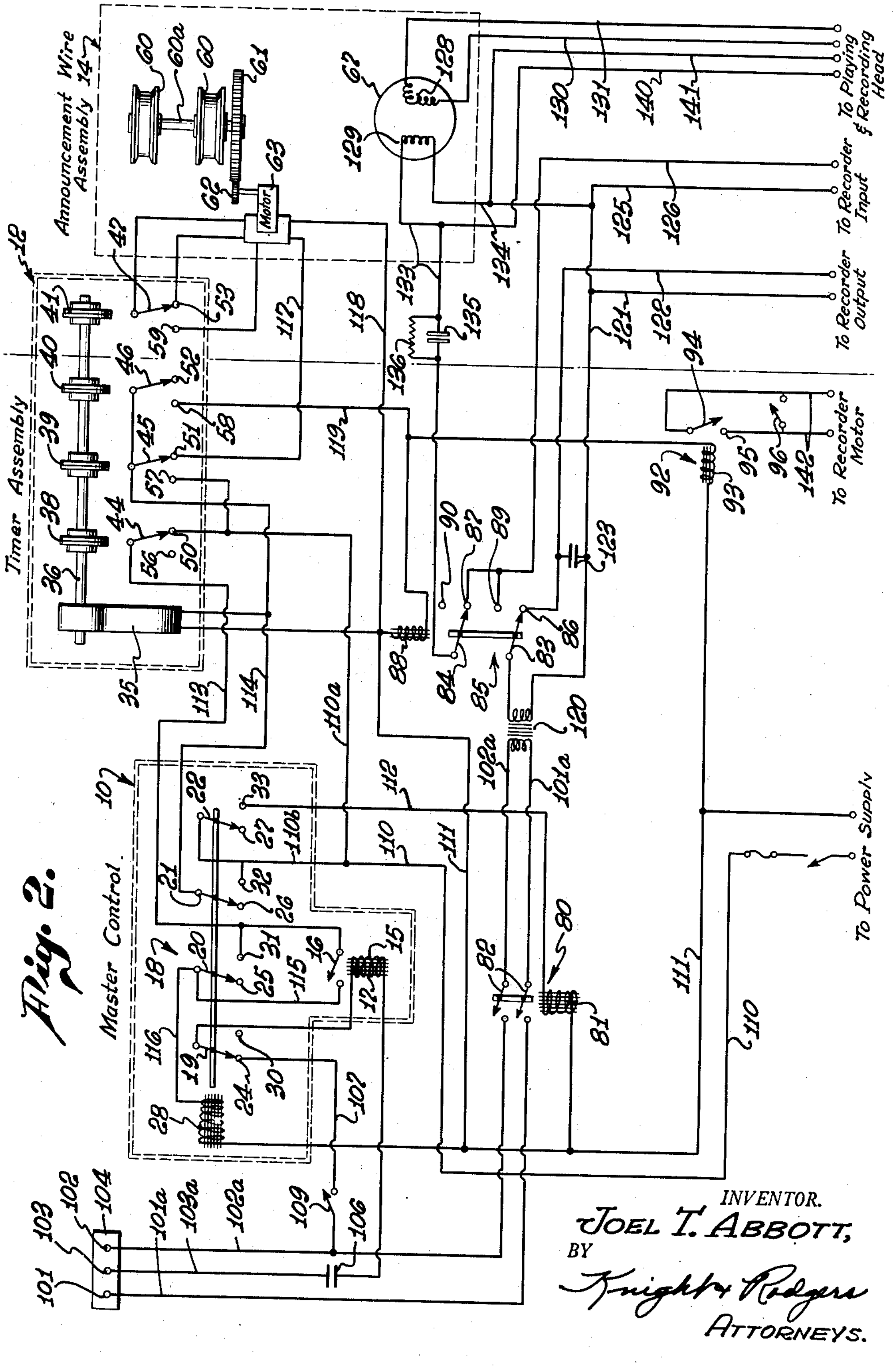
Fig. 2 is a wiring diagram of the attachment to the recording unit.

Referring now to the drawings, and especially to Figs. 1 and 2, it will be seen that the attachment for the recorder consists generally of a master control unit, a timer assembly, and an announcement wire assembly, indicated generally at 10, 12 and 14, respectively, in the drawings. In addition, there are certain other switches, relays, and other component parts. All of these elements are normally enclosed in a single housing, not shown in the drawings, to make a compact, portable, self-contained device.

Master control unit 10 consists of two separate sections. The first section is a single pole, single throw relay 15 which has normally open switch 16, comprising a movable contact engageable with a fixed contact when operating coil 17 of the relay is energized to close the switch.

The second section of the master control unit consists of a four pole, double throw relay 18. This relay has four movable blades or contacts 19, 20, 21 and 22 which are normally in engagement with fixed contacts, 24, 25, 26 and 27, respectively. Upon energization of relay operating coil 28, all four movable blades simultaneously move into the alternate position from the one shown in Fig. 2, in which alternate position they engage fixed contacts 30, 31, 32 and 33, respectively. In accord with my desire to use standard parts, relay 18 is shown as a commercially available relay of which each movable blade is movable between two positions in each of which it engages a fixed contact; but not all of these contacts are actually required or used in the present device. Under these circumstances it will be understood that the unused contacts may be omitted if desired and the relay modified accordingly; or four single pole single throw relays like relay 15 can be used in place of the gang relay shown.

Timer assembly 12 includes timer motor 35 which may be of any suitable conventional construction. The unit here shown diagrammatically is made by the Haydon Manufacturing Co., Inc., Torrington, Conn., and is adapted to revolve cam shaft 36 at a low rate of speed, as for example one-half revolution per minute. Mounted on shaft 36 are four spaced rotary cams 38, 39, 40 and 41, respectively. Mounted in a position adjoining the rotary cams, is a bank of four switches in such a position that each switch is operated by one of the rotating cams 38, 39, 40 and 41. These switches are all single pole, double throw switches normally closed at one side, as indicated in Fig. 2 by the movable contacts 44, 45, 46 and 47, being in contact with fixed contacts 50, 51, 52 and 53, respectively. By rotation of shaft 36, cam 38 is adapted to move switch 44 into the alternate position in which the movable blade engages the alternate contact 56. The movement or operation of switch 44 is independent of the movement of the other three switches in the bank. In a similar manner cams 39, 40 and 41 are adapted to move the associated switch blades 45, 46 and 47 into engagement with fixed contacts 57, 58 and 59 respectively. Since all four cams are attached to rotary shaft 36 in a fixed angular relation, the relative operation of the four switches in the bank is determined by the angular position and length of the cams, and the time relationship of switch operations remains fixed for any given cam positioning.

Figures 8, 9:
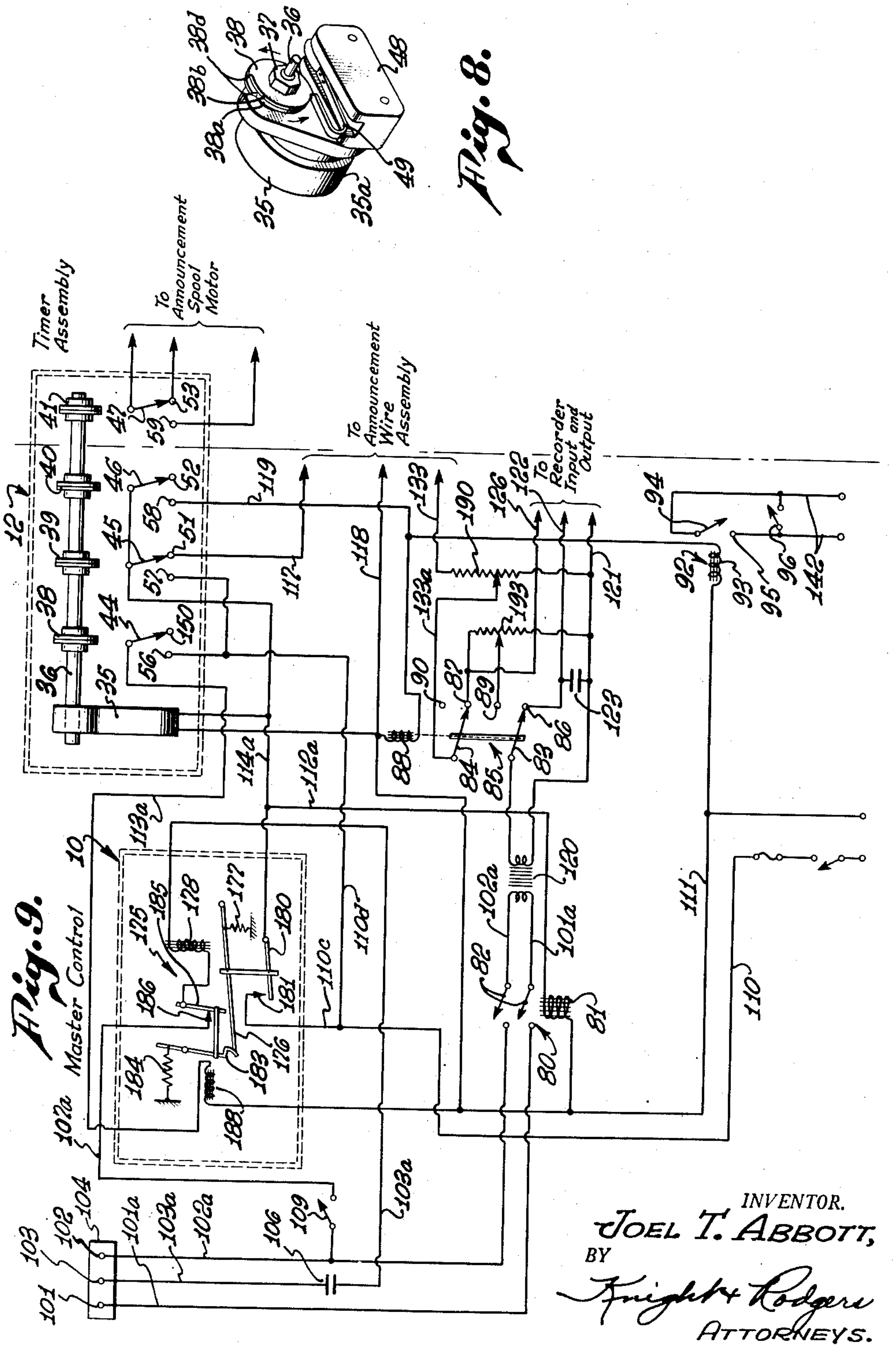
Fig. 8 is a fragmentary perspective of the timer assembly showing a single typical rotary cam and switch.
Fig. 9 is a fragmentary wiring diagram showing a variation in the wire circuits of that portion of Fig. 1 to the left of the vertical dot-dash line.

A preferred construction of the cams and their relation to their associated switches is shown in greater detail in Fig. 8 in which is illustrated a typical cam and switch. Motor 35 drives shaft 36 through a suitable speed reducing mechanism in housing 35*a*. Cam 38 consists of two discs or circular plates 38*a* and 38*b* of which each has a portion of full radius and a portion of reduced radius, the two portions being separated by shoulders 38*d*. The two discs 38*a* and 38*b* may be attached to shaft 36 by any suitable means, as for example by being held between a shoulder or a fixed member attached to shaft 36 and nut 37 which may be tightened against the discs to hold them frictionally in adjusted positions.

When nut 37 is loosened, discs 38*a* and 38*b* may be rotated with respect to each other and with respect to shaft 36. Rotation of the two discs together with respect to shaft 36 changes the time in the cycle of operation, as measured by the revolution of shaft 36, at which the switch is operated to move from the normally closed position to the alternate position or back again, while relative rotation of the two discs determines the relative length of time that the switch is in each position.

The switch as a whole is indicated in Fig. 8 at 48 and on its upper side it has a U-shaped operating lever 49 which is pivotally mounted to the switch body. The free end of operating lever 49 rides in engagement with the periphery of cam 38. When the operating lever engages that portion of the cam periphery where both sections of reduced radius of discs 38*a* and 38*b* coincide, then the lever is in the raised position. For purposes of this disclosure the lever may be either raised or depressed to place the switches in the initial or normal positions illustrated in Fig. 8; that is, the normal position is determined by the cam rather than by the characteristics of the switch itself. As the cam rotates counterclockwise viewed from the right-hand end, engagement of a shoulder 38*d* with operating lever 49 depresses it as the point of engagement of the operating lever passes from the coincident disc sections of reduced radius to a section of full radius. If the sections of reduced and full radius are each 180°, then the length of coincidence of the two sections of reduced radius can be any desired value between 0° and 180°, the remainder of the revolution of the cam being a period of engagement by the switch operating lever with a section of full radius of either one of cam plates 38*a* or 38*b*. All four of the cams 38, 39, 40 and 41 mounted on shaft 36 are constructed as shown in Fig. 8 and an infinite number of variations in the settings of the four cams are possible so that a wide range of combinations of periods can be obtained in which the switches are in the normal or alternate positions.

All of the switches in the timer assembly have been shown as double throw switches because that is the standard unit available. Since contacts 50 and 52 are not used in this wiring diagram, it will be apparent that single throw switches, normally open, may be substituted for blades 44 and 46. On the other hand, there are advantages in originally supplying double throw switches as it permits greater flexibility in the hook-up as will be explained later.

The announcement assembly comprises rotatably mounted drum means upon which an announcement wire is wound. One form of drum means (Figs. 3 and 4) is a pair of spools 60 mounted on shaft 60*a* which has attached at one end large gear 61 that meshes with and is driven by pinion 62 on the shaft of reversible motor 63. Spools 60 may thus be driven in either direction of rotation, and the gear ratio between pinion 62 and gear 61 is such as to produce a suitable speed of rotation of the spool. When two spools 60 are used any suitable means, of which shaft 60*a* is an example, may be provided to interconnect the spools for equal rates of rotation.

Spools 60 have wound upon them wire 65 which has a suitable announcement message magnetically recorded upon the wire. Wire 65 may in fact be endless, or it may merely have its ends attached at different points to the drum means. Here one end is fastened to each spool 60 so that the wire forms an endless loop 65*a*, the wire at either side of the loop being wound in opposite directions at spaced positions on the drum means or spools. As the spools rotate in a given direction, one end of the wire is unreeled from one spool 60 while the other end is reeled onto the other spool 60 at substantially the same rate. From one spool, wire 65 passes in a loop 65*a* over playing head 67 which is adapted to reproduce as electrical impulses the message magnetically recorded upon the wire. Playing head 67 may be of any conventional design suited to use with wire 65 or a similar member wound upon spools 60. After leaving playing head 67, the announcement wire passes over a tensioning device 68, now to be described, and then returns to the other spool 60 from which it started.

At both its ends, wire 65 is jumble wound upon spools 60, that is, no guiding or spooling device is provided to evenly coil the wire upon the spool and the wire winds or unwinds from a spool 60 where the successive turns fall by chance. The wire is so small relative to the spool dimensions that each turn of wire on the spool is of substantially the same length, even if one turn overlies another to a greater or lesser extent. Since the two spools constitute, in effect, a single drum, the wire is wound up, at an average, at the same rate as it is unwound, but any given instant the rate may vary slightly and this variation may continue over a short interval of time. For this reason it is desirable to introduce into the loop 65*a* of wire at a point between the playing head and the spool, a tensioning device. The effect of tensioning means 68 is to maintain the wire under substantially constant tension and to permit the length of the loop 65*a* of wire to vary in length, within limits, in order to compensate for any minor differences between the rates at which the wire is simultaneously unwound and rewound on the spools. This tensioning device comprises bar 70 pivotally mounted at 71 to swing about an axis which is in general perpendicular to the axis of shaft 60*a*. Also mounted on pivot 71 is a pulley 72 which is located opposite one message wire spool 60 so that wire 65 coming off the spool passes around pulley 72. It then passes in a direction generally along bar 70 to a second pulley 73 pivotally mounted on the bar adjacent head 67. From pulley 73 the wire passes to and around the playing head and then in a reverse direction back to the other spool 60 from which it started. Tension is placed in the message wire by spring 75 which is fixed at one end and attached at the other end to bar 70 to rotate the bar around axis 71 in a direction to place under tension the run of wire 65 between the playing head and pulley 73. As the loop of wire off the drum means increases or decreases in length, the length of the run between the playing head and pulley 73 correspondingly increases or decreases as the case may be; and bar 70 at one end moves toward and away from the playing head to accommodate this change in length, but the tension in the wire is maintained generally constant by spring 75.

In addition to the principal elements described above, the attachment comprises line relay 80 which has a double pole, single throw, normally open switch. Relay coil 81 is adapted to move the pair of movable contacts 82 into closed position to connect the device with the voice carrying wires of the telephone circuit.

Another relay 85 is provided to switch the connections to the input and output leads of the recorder unit. This relay has two single pole, double throw switches in which the movable contacts 83, 84 normally occupy a position in engagement with fixed contacts 86, 87 respectively, as shown in Fig. 2. Upon energization of operating coil 88, the movable contacts disengage fixed contacts 86 and 87 and move into engagement respectively with fixed contacts 89 and 90. Contact 90 may be omitted if desired when not used.

A third relay 92 is provided to control the operating circuit of the motor of the wire recorder in order to open and close that circuit. Relay 92 is a normally open, single pole, single throw type in which operating coil 93 when energized, moves the movable contact 94 into engagement with fixed contact 95. A manually operated single pole switch 96 forms a shunt across relay 92 for purposes which will be later described.

The usual three wires indicated at 101, 102 and 103 of the conventional telephone divided ringer circuit are connected to terminals of junction block 104 in a typical installation. The telephone instrument 105 is then connected to junction block 104 as indicated in Fig. 1. Wires 101 and 102 carry the voice current of the telephone, while conductors 102 and 103 carry the ringing current for the instrument.

The first section of the master control unit 10 is conductively connected across the ringing circuit of the telephone. This is done by lead 103*a* which connects one terminal of relay operating coil 17 with terminal 103 of junction block 104, there being a fixed condenser 106 of suitable capacity in line 103*a* in series with coil 17. The other terminal of coil 17 is connected to telephone wire 102 by conductor 102*a* and a branch conductor 107. Conductor 107 is in series with one of the switches of the second section of the master control unit, here shown as being movable contact 19 and fixed contact 24; and conductor 107 also has in series a manually operated switch 109 which may be opened when it is desired to disconnect the master control unit from the ringing circuit of the telephone and thus render the answering attachment inoperative.

Power for the operation of the attachment may come from any suitable source; and since the source will ordinarily be the conventional 110 v. A. C. circuit which is commonly available, it is herein shown as being that source. However, it will be realized that power may be supplied at other voltages and likewise may be supplied from a direct current source as well. If such is done, it is within the scope of persons skilled in the art to modify the relays and other component parts of the attachment as may be necessary to accommodate other characteristics of the power source.

Power is supplied through conductors 110 and 111. Conductor 110 is connected to the first switch of the timer assembly 12 by branch 110*a*, here being shown as connected to fixed contact 50. The circuit is then completed through movable contact 44 and conductor 113 to the second switch of the second section and to the main switch of the first section, of the master control unit 10. In detail, conductor 113 leads from contact 44 to fixed contact 31, which is engageable by movable contact 20, and also to switch 16 of relay 15, the other side of switch 16 being connected by conductor 115 to movable contact 20 so that the two switches 16 and 20 of the first and second sections respectively of the master control unit are placed in parallel with each other. The circuit then proceeds by conductor 116 from movable contact 20 to one terminal of relay operating coil 28, the other terminal of which is connected to power supply conductor 111. By this arrangement, the relay operating coil 28, the second switch of the second section of unit 10, and a switch of the timer assembly are all placed in series, with switch 16 of the master control unit in parallel across contacts 20 and 31.

Power supply is connected to the third and fourth switches of the second section of the master control unit 10, conductor 110 having a branch 110*b* typically connected to fixed contact 32 of the third switch and to movable contact 22 of the fourth switch of relay 18. Power supply is also connected to the second switch of the timer assembly 12 by conductor 110*a* which is connected to fixed contact 57 cooperating with movable contact 45 of the timer assembly.

The third switch of master relay 18 of unit 10 is connected to motor 35 driving the timer assembly and also to the second and third switches of the timer assembly so that power may be supplied thereto when switch blade 21 is in the proper position to close the circuit. In the wiring diagram, movable blade 21 is connected by conductor 114 to one terminal of motor 35 and also to movable contacts 45 and 46 of the second and third switches respectively of the timer assembly, all these connections being arranged in parallel. Fixed contact 51 cooperating with movable contact 45 is connected by 117 to one terminal of motor 63 driving spools 60, the other terminal of this motor being connected by 118 to return power supply conductor 111, thus forming a circuit for providing power to the motor for its operation. Fixed contact 58, cooperating with movable switch blade 46 of the timer assembly, is connected by conductor 119 to the operating coil 88 of relay 90 and operating coil 93 of relay 92, these two relays being arranged in parallel. The other terminals of the two operating coils are both connected to return conductor 111.

The fourth switch of relay 18 is connected to the main line relay 80 by conductor 112 which leads from fixed contact 33 of the relay switch to one terminal of relay operating coil 81. The other terminal of coil 81 is connected to return power supply line 111.

The fourth and last switch of the timer assembly is connected only to the field coils of motor 63 which is of such a type that its rotation can be reversed by reversing the effective connections of the field coils. A common terminal of the coils is connected to movable contact 47, two other terminals of the coils being connected to fixed contacts 53 and 59. When blade 47 engages terminal 53 as shown, the field circuit of the motor is such as to drive it in one direction, which may be termed the forward direction, while the field is reversed when blade 47 engages fixed contact 59 so that the motor is driven in the other or reverse direction.

The voice circuit is brought into the answering device by wires 101*a* and 102*a* which are connected respectively at one end to telephone wires 101 and 102 at junction block 104. Since it is desirable to interrupt both conductors when breaking the voice circuit, the switch of relay 80 is preferably a double pole switch having a movable contact in each of wires 101*a* and 102*a*. This switch is operated by operating coil 81 of the relay to which power is supplied from the fourth or last switch of section 18 of the master control unit. One terminal coil 81 is connected to fixed contact 33, which, when engaged with movable contact 22, can be connected to conductor 110; the other terminal of operating coil 81 is connected to return conductor 111.

The two conductors 101*a* and 102*a* are attached one each to the two terminals of the primary of impedance matching transformer 120. The secondary of transformer 120 is connected to conductors 121 and 122 which lead to the output plug of the recorder unit. The connection to one conductor, as 121, may be direct; but the connection to the other is through relay 85. One terminal of the secondary of transformer 120 is connected to the movable contact of relay 85, while conductor 122 is connected to the cooperating fixed contact 86. In this manner the circuit from transformer 120 to the recorder output may be established or interrupted by movement of the switch blade 83 in relay 85. To improve the operating characteristics, fixed condenser 123 is connected in shunt across the transformer secondary between wires 121 and 122.

The input of the wire recorder unit is also adapted to be connected to the secondary of transformer 120. For this purpose, there is provided a pair of conductors 125 and 126, the first of which is connected to conductor 121 or directly to one terminal of the transformer, and the other of which is connected to fixed contacts 87 and 89 of relay 85. Thus when the switch blade 83 moves to the alternate position and engages contact 89, the circuit is established from the recorder input through the transformer secondary and back through the other wire to the recorder input.

The announcement wire assembly includes playing head 67 which may be of any suitable conventional construction, and the wiring diagram may differ from that shown herein in the event that the playing head is wired in another manner. However, a typical playing head comprises bias and eraser coils connected in series, as indicated at 128, and connected to the recorder by conductors 130 and 131. The playing head also includes voice coil 129 which is normally connected to the recorder input by conductors 133 and 134. Conductor 133 goes from one terminal of the voice coil to movable contact 84 of relay 85. The circuit continues from blade 84 to fixed normally closed contact 87 to conductor 126 and then to the recorder. The other terminal of voice coil 129 is connected by wire 134 directly to conductor 125. Electrical impulses in head 67 produced by the passage of wire 65 over the head are transmitted to the recorder unit and amplified, and are then transmitted out of the unit from the recorder output over conductors 121 and 122 to the impedance matching transformer 120. The conductor 133 preferably has in series fixed condenser 135 and resistor 136, in parallel therewith, to improve speech characteristics. Most, or nearly all, present day recording units are manufactured with an externally accessible input plug to receive leads from a microphone or other electrical pick up unit. Hence my attachment can usually be plugged into the recorder by means of the input plug and in place of the microphone without modifying the recorder; otherwise the leads 125 and 126 can be connected internally in parallel with the playing head of the recorder.

Head 67 may be used to impress the announcement on wire 65, and to erase the wire and place on it a new announcement. For this purpose conductors 140 and 141 are connected to conductors 133 and 134 respectively, the other ends being connectible to the recorder. When all four conductors, 130, 131, 140, 141 are connected to the recorder duplicating the connections to the head in the recorder, then head 67 will erase or record on wire 65. These four wires may be placed in a single auxiliary cable to be used as needed. This connection is optional and may be omitted entirely if desired.

The circuit of the answering attachment is completed by switch 94 of relay 92. Switch 94 when closed makes continuous the conductor 142 which is one wire leading to the drive motor of the recording unit. When switch 94 is closed by engagement with fixed contact 95, the circuit to the drive motor can be established; and when the switch is open it is interrupted. Manually operated switch 96 is in parallel across switch 95 so that the circuit to the drive motor may be established without operating relay 93. For this reason switch 96 is normally placed upon the cabinet of the recording unit, rather than in the cabinet of the attachment, and a plug and jack connection is made for conductor 142 at a suitable point between relay 93 and switch 96.

Having described the construction and wiring of my improved telephone answering unit, I shall now describe its normal operation. To install the device in a divided ringer circuit, wires 101*a*, 102*a* and 103*a* are conductively connected to the telephone circuit as by making connections at junction block 104, or by providing a plug and jack connector which allows the answering attachment to be plugged easily into the telephone circuit with the same result as making connections to the junction block. Some telephones have a bridged ringer circuit which requires only the two wires 101 and 102; and in that case both conductors 101*a* and 103*a* are connected to one incoming phone wire and 102*a* is connected to the other one. The operation of our device is, however, the same for either type of telephone circuit. Conductors 111 and 110 are now connected to a suitable source of power. Three connections are then made to the recording unit; and these connections may be of the plug and jack type for convenience and ease of connection or disconnection, or they may be made in any other desired fashion. The exact location and character of them depends in each instance upon the type of recorder used in conjunction with my telephone answering attachment; but in general they comprise a connection into the drive motor circuit as indicated by conductor 142, a connection to the recorder output by conductors 121 and 122, and a connection of conductors 125 and 126 to the recorder input. The auxiliary cable carrying conductors 130, 131, 140 and 141 need be connected to the recorder only when it is desired to erase the announcement message and then place a new message on announcement wire 65.

Assuming the installation to be complete, switch 109 is normally open and switch 96 closed when it is desired to use the recorder alone in its normal fashion and to make the attachment inoperative so that it does not function to answer the telephone. Master switch 109 disconnects the attachment from the ringing circuit and permits the telephone to be operated in the usual normal fashion. When it is desired to have the attachment function to answer the telephone automatically, switch 96 is opened so that the motor drive circuit is controlled by relay 93, and master switch 109 is closed to complete the ringing circuit.

When a telephone call now comes in over the normal telephone wires, electric current in the ringing circuit passes through operating coil 17 of relay 15, energizing the coil. The coil draws down the armature of the relay, closing switch 16. Prior to the time that switch 16 is closed, all four switches of relay 18 and the four switches of timer assembly 12 occupy their normal positions indicated in the wiring diagram. When switch 16 is closed, the power supply circuit is completed through operating coil 28 of relay 18, causing the relay armature to move and carry with it movable contacts 19, 20, 21 and 22 to the alternate positions in which they respectively engage normally open contacts 30, 31, 32 and 33. All four switches of the relay in this second section of the master control unit are operated simultaneously and four separate circuits are established as will now be explained; and the same circuits are interrupted subsequently when or after the relay is de-energized to allow the switches to resume normal positions.

Movement of the first switch shifts movable contact 19 from fixed contact 24 to fixed contact 30 thus interrupting the circuit to relay 15 and de-energizing coil 17. As a result, switch 16 returns to its normally open position. However, opening switch 16 does not now interrupt the circuit to coil 28 because the actuation of the relay 18 carries movable contact 20 of the second switch into engagement with fixed contact 31, thus establishing the power supply circuit to operating coil 28 independently of switch 16. As long as switch 20 engages contact 31 and switch 44 engages contact 50, coil 28 remains energized and the armature is held in the alternate position. This power supply circuit actually remains established as long as the first micro-switch continues in the normal position illustrated in which movable blade 44 engages contact 50.

The actuation of relay 18 of the master control unit also energizes motors 35 and 63. When the third switch of relay 18 closes to bring blade 21 into engagement with fixed contact 32, power is supplied through conductor 114 to motor 35 of the timer assembly; and through conductors 114 and 117 and the second micro-switch 45 to motor 63 of the announcement wire assembly, thus starting both of these motors. Motor 35 rotates cam shaft 36 carrying cams 38, 39, 40 and 41 which effect a time controlled operation of their associated switches. As motor 63 operates it causes the announcement message wire to pass over playing head 67 so that the announcement message thereon is reproduced.

This announcement message becomes audible to the party making the telephone call because the fourth switch of the master control unit has been closed by movement of movable blade 22 into engagement with fixed contact 33, thus energizing coil 81 and by way of conductor 112 closing contacts 82 so that impedance matching transformer 120 is connected across the voice circuit of the telephone. Announcement message is reproduced by voice coil 129 and the impulses are transmitted through switch 84 of relay 85 and conductors 133 and 134 to conductors 125 and 126 and thence into the recorder where they pass through the audio circuit of the recorder for amplification. From the recorder they are then transmitted over output leads 121 and 122 to the secondary of transformer 120. The transformer impresses these impulses on the voice circuit so that they are audible to the person originating the incoming telephone call.

After initial establishment of the several subordinate circuits by actuation of relay 18 in the master control unit as just described, further operation of the unit is controlled on a time basis by timer assembly 12. The first period of operation is that during which the announcement message is transmitted outwardly over the voice circuit, as just described. This period may last for any pre-established interval, such as fifteen seconds or other time as may be required to complete a given announcement. The length of this pre-set interval is determined by the circumferential length of the coincident portions of reduced radius of cam 40 which is being rotated slowly by shaft 36. As explained above, each cam is preferably of a type in which adjustment of the cam can be made simply, both as to circumferential length of the operating sections and their relative angular position on the shaft, so that the length of this or any other interval may be adjusted to the needs of each individual user of the device.

Figures 4, 5, 6, 7:
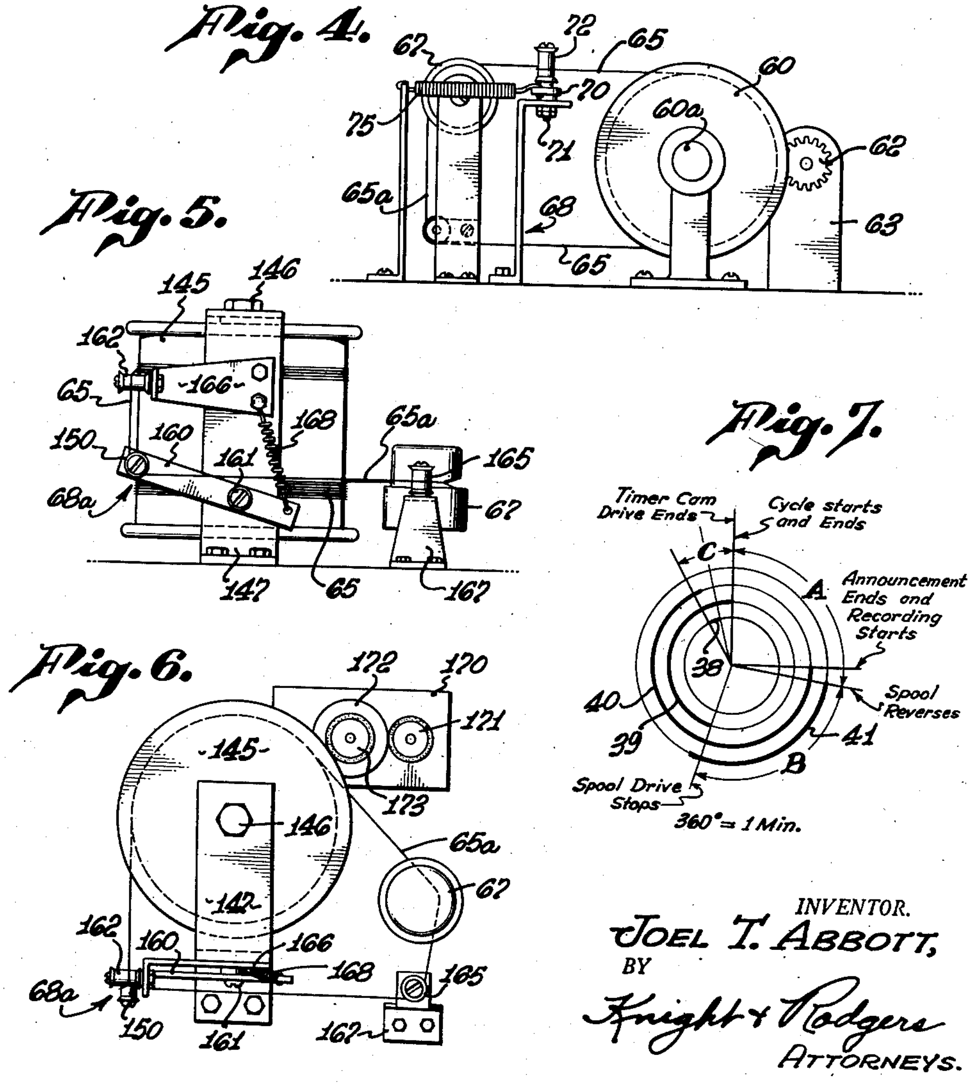
Fig. 4 is an end view of the spool assembly of Fig. 3.
Fig. 5 is an elevation of a variational form of announcement message wire spool assembly.
Fig. 6 is a plan view of the assembly of Fig. 5.
Fig. 7 is a diagram showing timing of the rotary cams.

The relative relationship of the four cams 38–41 to their switches is shown diagrammatically in Fig. 7 by four concentric circles. The diagram is constructed in such a manner that moving clockwise from the vertical radius or zero position of the cam, the diagram indicates what portion of any cam is in contact with operating lever 49 of the associated switch actuated by the cam. Physically, the diagram is the equivalent of moving the switch around the stationary cam. As a result of this construction it will be seen that any radius in Fig. 7 passing through the four circles shows the simultaneous positions of the four cams at the points of intersection. The light portion of each circle is the interval during which the switch is in the normal position shown in the wiring diagram of Fig. 2; while the heavy portion of the circle is the remainder of the revolution in which the switch is in the alternate position, whether lever 49 is raised or depressed.

In order to present a concrete illustration of the operation of the timer assembly, Fig. 7 is based upon a rotational speed of shaft 36 of 1 R. P. M. so that one minute is required to complete one revolution of the cams. On this same basis, the first period of operation during which the announcement message is transmitted, in the manner just described, amounts to one-fourth revolution if that interval is 15 seconds, as illustrated in Fig. 7. Of course the speed of shaft 36 may be more or less as desired and any interval adjusted to suit specific needs.

At the termination of this pre-established interval of time during which the announcement is being made, cam 40 operates switch 46 to close it by bringing movable contact 46 into engagement with fixed contact 58. Operation of this third switch of the timer assembly simultaneously energizes relays 85 and 92. Energization of relay 85 moves blades 83 and 84 out of engagement with contacts 86 and 87 respctively, thus breaking the connection of voice coil 129 to the recorder input and the connection of transformer 120 to the recorder output. Energization of the coil 88 moves the relay to the alternate position in which blade 83 engages fixed contact 85, in which position a circuit is established to the recorder input over conductors 121—125 and 126 from the secondary of transformer 120. In this position incoming impulses on the voice circuit of the telephone are transmitted through the transformer and through the input side of the recorder so that the person making the call can now dictate a message which will be then recorded upon the wire or tape or other recording media of the recorder unit in the same manner as if the message were being spoken into the microphone or other normal pickup unit of the recorder. Voice coil 120 remains disconnected and inoperative during this period of recording for as long as blade 84 is out of engagement with contact 87.

Energization of coil 93 of relay 92 closes the switch 94 thus energizing recording unit drive motor to cause that element to move the recording medium past the recording head as is normal in the unit to permit recording an incoming message. The movement of switch 46 to the alternate position thus simultaneously terminates the announcement period and starts the recording period, as indicated in Fig. 7.

Shortly after the third switch 46 of the timer assembly bank has been operated by cam 40, cam 41 actuates the fourth switch 47, moving blade 47 out of engagement with fixed contact 53 and into the alternate position of engagement with fixed contact 59, thus effecting a reversal in direction of movement of motor 63. As a result, spools 60 are driven in the reverse direction and the message wire 65 is rewound onto the drive means so that it occupies substantially its original position. The time interval from the beginning of a cycle until the spool motor is reversed by operation of cam 40 is indicated in Fig. 7 by the angle A. It will be understood of course that the period of rewinding is made equal in length to the period of unwinding during the announcement time so that the amount of wire rewound is substantially equal to the amount unwound in the first instance. In this way the wire is returned to the position in which the same announcement message can be repeated by passing the wire over playing head 67. Consequently angle B equals angle A in Fig. 7. The rewinding action of motor 63 is stopped by operation of cam 39 to open the second switch of the bank and move blade 45 out of engagement with fixed contact 51, thus interrupting the power supply to the motor.

At this point in the operative cycle of the device, an announcement message has been put out over the telephone wires and then the announcement wire has been rewound onto the spool. Now the announcement assembly drive motor 63 has stopped. Switch 44 is still in the initial position illustrated, but the other three switches 45, 46 and 47 are in the alternate positions. Blade 47 can now return to the initial or normal position at any time and does so shortly after the spool motor 63 stops; but the blades 45 and 46 continue on in engagement with contacts 57 and 58 respectively. As long as blade 46 is in contact with fixed contact 58, relays at 85 and 92 are maintained energized.

While relays 85 and 92 are energized, the person making the call can continue to dictate and have his message recorded. This recording period or interval may last for any desired time as determined by the settting of cam 38, and it is terminated by cam 38 moving switch 44 out of engagement with fixed contact 50. Switch 44 may be in the alternate position only momentarily as indicated in Fig. 7. Disengagement of blade 44 from contact 50 interrupts the power supply to coil 28 of the main relay of the master control unit, allowing that relay to return to its normal position in which movable contacts 20, 21 and 22 are disengaged from fixed contacts 31, 32 and 33 respectively and movable contact 19 re-engages contact 24. It will be noticed that this return movement of the armature of relay 18 interrupts the circuit to the relay coil 28, and also circuits established by the relay for power supply to motor 35 and motor 63, and power supply to line relay 80. Coil 81 being de-energized, opens switch 82.

When the second switch 45 of the timer assembly was moved out of engagement with fixed contact 51, it was moved into engagement with fixed contact 57 which is connected directly to power supply conductor 110. By this means a secondary circuit is established through movable contact 45 and portions of conductors **110*a* and 114 which continue to energize timer motor 35 without interruption when relay 18 opens. As a result the final part of the timer assembly operation after switch 44 is opened is controlled by cam 39 since it continues to supply current to motor 35 to complete one full revolution of shaft 36. This terminal part of the cycle is denoted by angle C in Fig. 7. At 360° of revolution of shaft 36, cam 39 returns switch 45 to its normal position in which it engages fixed contact 51, thus stopping the secondary supply of power to motor 35 and stopping the rotation of shaft 36** with the attached cams. This completes the cycle of operation of the device.

At the end of the complete cycle of operation the parts have been automatically restored to the starting positions. Relay 18 has closed the connection of the ringing circuit to relay coil 17 through switch 19 but the other circuits controlled by that relay are open. Likewise the four switches of the timer assembly have been restored to the positions shown in the wiring diagram in which the circuit supplying power to the master control unit and motor 63 are completed in the timer switches, but the circuit energizing relays 85 and 92 is interrupted. Also the fourth switch has been restored to a position in which motor 63 drives in a forward direction when again energized. De-energization of relay 85 has again connected transformer 120 to the recorder output and the de-energization of relay 92 has opened switch 49, stopping the motor driving the recorder. Upon receipt of an electrical impulse from the ringing circuit, the adapter is now all set again to go through the cycle of operations described above.

Figure 3:
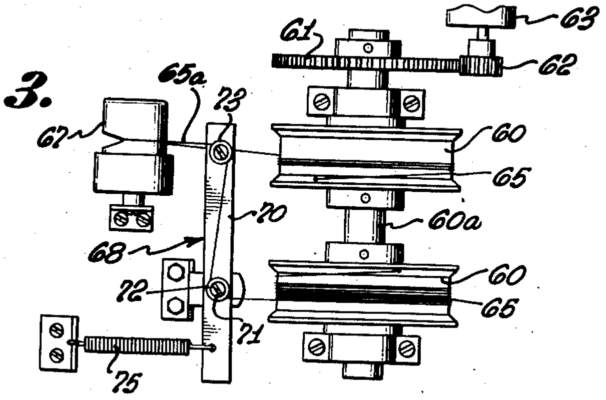
Fig. 3 is a plan view of the announcement message wire spool and reproducing assembly.

In Figs. 3 and 4, I have shown a preferred form of drum means for carrying the announcement wire, together with means for tensioning the wire. In Figs. 5 and 6 is shown a variational embodiment of this construction in which the simplified drum means comprises a single spool 145 mounted to rotate about a vertical shaft 146 which is supported in position by bracket 147. The announcement wire 65 is wound upon spool 145 in two spaced positions. One portion of the wire is wound on the spool near one end, while another portion of the wire is wound in the opposite direction upon the spool near the other end thereof. The intermediate portion of the announcement wire forms a loop 65*a* which passes around playing head 67 and also over the tensioning means indicated generally at 68*a*.

This tensioning means comprises rotatable pulley 150 pivotally mounted on arm 160 which in turn is pivotally mounted at 161 on bracket 147. After coming off one end of spool 145, wire 65 passes over pulley 162, then around pulley 150, and then around pulley 165 to playing head 67 from which the wire goes to the opposite end of spool 145. Pulleys 162 and 165 are merely idlers which may be mounted in any suitable location to effect the desired change in direction of wire 65, and are here shown as being mounted on brackets 166 and 167 respectively.

As previously explained, the announcement wire 65 is jumble wound upon spool 145, that is the successive turns are located upon the spool where they fall by chance. For this reason as the spool is rotated in either direction, the wire may temporarily unwind at a slightly greater rate than it is simultaneously wound onto the spool, or vice versa. The object of the tensioning means 68*a* is to maintain a substantially constant tension in the wire and to prevent any slackness in loop 65*a*. This is accomplished by the pull of spring 168 which is fixed at one end and attached to pivoted arm 160 at the other end. Since the pivot point 161 in arm 160 is between the point of connection of spring 168 and pulley 150, the pull of the spring keeps a substantially uniform tension in the wire and any minor change in the length of loop 165 is reflected by a corresponding change in the length of the run of the wire between pulleys 150 and 162.

Drum means 145 may be rotated in either direction by power delivered from reversible electric motor 160. As shown in Fig. 6, the drive pulley 171 of the motor frictionally engages pulley 172 mounted upon an idler shaft to which is also attached pulley 173. The latter pulley frictionally engages the rim of drum 145 to rotate the latter. The drum may be driven directly from pulley 171 if desired, but the intervening pulleys form a speed reducing train by which the rotational speed of spool 145 may be closely regulated.

There is shown in Fig. 9 a variational form of my invention which uses a different type of relay for the master control unit and which also includes volume controls.

Master control 10 as shown in Fig. 9 includes a single relay 175 instead of the two section or two relay unit illustrated in Fig. 2. Relay 175 is of the latch-in type in which a mechanical latch holds the armature in the advanced position independently of the presence in the main operating coil of an electric current. This latch removes the need of relying upon continuation of the energizing current as in coil 28 of relay 18 to hold the armature forward. Relay 175 includes armature 176 which is biased by spring 177 toward a retracted position, but which may be moved against the pull of spring 177 to a forward position by energization of operating coil 178. Mechanically attached to armature 176 and movable therewith is movable switch element 180 which cooperates with fixed contact 181.

Mechanical latch 183 is biased by tension spring 184 toward a holding position so that when armature 176 is advanced by energization of coil 178, latch 183 falls in behind the armature and holds it securely in the advanced position, even though coil 178 is subsequently de-energized. Connected to latch 183 to be operated thereby is movable switch element 185 which cooperates with fixed switch contact 186, these switch elements being wired in series with operating coil 178 as illustrated in the wiring diagram of Fig. 9. When the latch is in the holding position, it is pulled down by spring 184 and switch contacts 185 and 186 are separated, opening their circuit at this point. When the latch is moved to the non-holding position, it is held in this position by engagement with armature 176 as long as the armature is in the open position, and the latch holds contacts 185 and 186 together, closing the circuit through this switch. Latch 183 is moved to the release position by the energization of release coil 188.

Certain modifications in the arrangement of the wiring result from the change in the nature of the master control relay. Incoming conductor 103*a* comes from condenser 106 and is connected to the free terminal of operating coil 178, the other terminal of the coil being connected to switch contact 185. This conductor is part of the ringing circuit which is completed by conductor 107*a* connected between fixed switch contact 186 and switch 109. Thus, when switch 109 is closed in order to place the answering attachment into operation, an impulse over the ringing circuit of the telephone energizes operating coil 178 as long as contacts 185 and 186 are engaged.

Power supply is provided by conductors 110 and 111 as before, the conductor 110 having two main branches 110*c* leading to the master control unit and 110*d* leading to the timer assembly. Branch 110*c* is attached to fixed contact 181. The only change in wiring connections in the timer assembly brought about by the change in the character of the master control relay is the fact that branch 110*d* is connected to fixed contact 56 of the first timer switch instead of to fixed contact 50 as was the case with branch 110*a* in Fig. 2. With the arrangement of Fig. 2, switch 44 is normally closed except for a short interval of time, while with the arrangement of Fig. 9, switch 44 is normally open except for a short interval of time when it is closed by bringing blade 44 into contact with fixed contact 56, as will be described later. Power supply to the timer assembly from the master control unit is through conductor 114*a* which, as before, is attached to movable contacts 45 and 46 of the timer assembly, the other end of conductor 114*a* being attached to movable element 180 of switch 180—181.

A change in the wiring will be noted in that conductor 112*a* leading to relay 80 is connected to conductor 114*a* so that power is supplied to operate relay 80 when switch 180—181 is closed. Conductor 113*a* is connected as formerly to movable switch element 44 but in the present form of the invention is connected to one terminal of release coil 188 which actuates latch 183, the other terminal of coil 188 being connected to line 111.

The operation of the circuit shown in Fig. 9 is essentially the same as that formerly shown and described. When the ringing impulse comes in over wires 102*a* and 103*a*, coil 178 is energized and moves armature 176 to the advanced position, closing the main relay switch by bringing contact 180 into engagement with contact 181. The armature is held in the advanced position by latch 183 which is allowed to drop into holding position by movement of the armature, the movement of the latch opening switch contacts 185 and 186 so that the ringing circuit is interrupted and coil 178 is deenergized. Closing contacts 180 and 181 supplies power to switches 45 and 46 of the timer assembly and to motor 35 of the timer so that the timer is placed in operation. Closing the main switch of the master control unit also energizes line relay 80 through conductor 112*a* so that the answering device is immediately connected to the voice circuit of the telephone circuit, all as previously described.

Having once been placed in operation, the answering device goes through the same cycle of operations as described above and illustrated graphically in Fig. 7. The only change in timer operation comes when cam 38 moves blade 44 into momentary engagement with fixed contact 56. During this short engagement of the contacts 44 and 56, release coil 188 is energized to raise latch 183 and allow armature 176 to be returned by spring 177 to the position shown in Fig. 9 in which contacts 180 and 181 are separated. Opening this main switch of the relay interrupts the power source to the timer assembly and to the relay 80 so that the recording period is terminated.

However, power is still supplied to motor 35 through the auxiliary circuit as long as contacts 45 and 57 are engaged so that the cams continue to rotate through the angle C of Fig. 7 in order to restore all the parts to their initial positions from which a complete operating cycle may again be repeated. In this respect, the operation of the circuit shown in Fig. 9 is the same as the circuit shown in Fig. 2.

Comparing the functions of the two circuits, it will be noted that latch switch 185—186 of Fig. 9 performs the general function of switch 19 by interrupting the ringing circuit after the initial impulse has actuated the master control unit. Latch 183 has been substituted for means of completing the electrical circuit to hold the relay in place and so is roughly the equivalent of switch 20. The armature switch 180—181 performs the combined functions of switches 21 and 22 by establishing circuits which supply operating power to the timer assembly and to relay coils 81 and 88.

The operation of the answering attachment has been made somewhat more flexible by the addition of two volume controls indicated in the circuit of Fig. 9. The volume of the announcement may be regulated by means of variable resistance 190 connected across between conductors 121 and 133, the variable contact of this variable resistance being connected by conductor **133*a* to movable contact 84. A similar arrangement is provided for controlling the volume of the voice for recording purposes. It includes a variable resistance 193 connected across between conductor 121 and fixed contact 87, the variable contact of the resistance being connected directly to the contact 89. These controls are optional and are provided to permit adjustment of sound levels to desired values without the necessity of using the sound controls provided on the sound recording unit. When the values of resistances 190 and 193** are once set, they may ordinarily be left alone on any given installation as long as other conditions remain constant.

From the foregoing description, it will be apparent that various changes in the type and location of the specific component parts of my invention may occur to persons skilled in the art and that such changes may be made without departing from the spirit and scope of my invention. Consequently, it is to be understood that the foregoing description is considered as being illustrative of, rather than restrictive upon, the appended claims.

I claim:

1. In an attachment for an electrical voice recorder adapted to utilize the recorder for automatically recording telephone messages, the combination comprising: a first relay means conductively connected to the ringing circuit of a telephone and actuated by the ringing current to close a circuit conductively connecting the attachment to the voice carrying circuit of the telephone; means for reproducing a recorded announcement; first circuit means electrically connecting the reproducing means through the recorder to the voice circuit of the telephone to transmit the announcement over the telephone voice circuit; second circuit means electrically connecting the recorder to the voice circuit to record in the recorder a message coming in over the voice circuit; a second relay means operating a switch in each of said first and second circuit means to disconnect the first circuit means from the voice circuit and then connect the second circuit means to the voice circuit; timing mechanism; and a switch in the energizing circuit of the first relay means operated by said timing mechanism to de-energize the first relay means after a predetermined interval of time to disconnect the attachment from the voice circuit of the telephone.

2. In an attachment for an electrical voice recorder adapted to convert the recorder to part of an automatic telephone answering and message recording system, the recorder having input and output terminals, the combination comprising: a first relay means normally connected conductively to the ringing circuit of a telephone and operative in response to an electrical impulse in the ringing circuit of the telephone; a second relay means normally disconnected from the telephone and electrically actuated by said first relay means to connect the voice circuit of the telephone to the attachment; a timer assembly including a drive motor electrically connected to the first relay means for initiation of operation of the timer by energizing said motor in response to the operation of the first relay means, the timer assembly also including a plurality of sets of switch members and means driven by said motor for operating individual sets of switch members at different predetermined times; an announcement assembly including a playing head and a drive motor having a power supply circuit including and controlled by one set of said switch members of the timer assembly; circuit means connecting the announcement playing head to the recorder input terminals and through the recorder to the voice circuit of the telephone; and relay means having an actuating circuit including and controlled by another set of said switch members of the timer assembly for disconnecting the playing head from the voice circuit after a predetermined interval of time.

3. In an attachment for an electrical voice recorder adapted to convert the recorder to part of an automatic telephone answering and message recording system, the recorder having input and output terminals, the combination comprising: a first relay means normally connected conductively to the ringing circuit of a telephone and operative in response to an electrical impulse in the ringing circuit of the telephone; a second relay means normally disconnected from the telephone and electrically actuated by said first relay means to connect the voice circuit of the telephone to the attachment; a timer assembly including a drive motor electrically connected to the first relay means for initiation of operation of the timer by energizing said motor in response to the operation of the first relay means, the timer assembly also including a plurality of sets of switch members and means driven by said motor for operating individual sets of switch members at different predetermined times; an announcement assembly including a playing head and a drive motor having a power supply circuit including and controlled by one set of said switch members of the timer assembly; circuit means normally connecting the announcement playing head to the recorder input terminals; other circuit means separately and connecting the voice circuit of the telephone to the recorder output terminals or to the recorder input terminals; and relay means incorporated in said circuit means and having an actuating circuit controlled by another set of said switch members of the timer assembly for disconnecting the recorder output terminals and connecting the recorder input terminals to the voice circuit of the telephone.

4. In an attachment for an electrical voice recorder adapted to convert the recorder to part of an automatic telephone answering and message recording system, the recorder having input and output terminals, the combination comprising: a first relay means normally connected conductively to the ringing circuit of a telephone and operative in response to an electrical impulse in the ringing circuit of the telephone; a second relay means normally disconnected from the telephone and electrically actuated by said first relay means to connect the voice circuit of the telephone to the attachment; a timer assembly including a drive motor electrically connected to the first relay means for initiation of operation of the timer by energizing said motor in response to the operation of the first relay means, the timer assembly also including a plurality of sets of switch members and means driven by said motor for operating individual sets of switch members at different predetermined times; an announcement assembly including a playing head and a drive motor having a power supply circuit including and controlled by one set of said switch members of the timer assembly; circuit means connecting the announcement playing head to the recorder input terminals and through the recorder to the voice circuit of the telephone; relay means having an actuating circuit including and controlled by another set of said switch members of the timer assembly for disconnecting the playing head from the voice circuit after a predetermined interval of time; and means electrically connecting the first relay means to a third set of said switch members of the timer assembly and to the first relay means to de-energize the first relay means after a fixed time and cause it to release the second relay means and break the connection to the voice circuit established by said second relay means.

5. In an attachment for an electrical voice recorder adapted to utilize the recorder for automatically recording telephone messages, the combination comprising: a timer assembly including a plurality of switches and motor driven means engaging each switch individually for operating the switches individually at predetermined time intervals; relay means conductively connected to the ringing circuit of the telephone and responsive to an impulse in the ringing circuit of the telephone to place the timer assembly in operation; an announcement assembly including a playing head, drum means for moving past the playing head a recording medium on which an announcement is recorded, and a reversible motor operatively connected to the drum means; a power circuit connected to the drum motor and including in series one of said switches of the timer assembly maintaining the power circuit closed to supply power for a predetermined period of time to the drum motor; and second circuit for reversing the drum motor and including a second one of the switches of the timer assembly operated midway of said power supply period to reverse the motor and return the recording medium to its starting point relative to the playing head.

6. In an attachment for an electrical voice recorder adapted to utilize the recorder for automatically recording telephone messages, the recorder having a drive motor, a combination comprising: a first relay means normally connected conductively to a telephone circuit and responsive to an impulse in the ringing circuit of the telephone to connect the attachment to the voice circuit of the telephone to place the attachment in operation; a timer assembly for controlling operation of the attachment and recorder and including a plurality of separate switches, a motor, and means driven by the motor and individually engaging the switches to operate the switches individually at predetermined times; a power circuit connected to the motor to supply power thereto and connected to the relay means to effect control of the supply of power through said power circuit; a reversible motor connected in series to one of said timer switches to be started and stopped by operation of said one switch; means electrically connecting the field of the motor to a second one of said timer switches to effect reversal of said motor by operation of the second switch; a second relay means connected into the power supply circuit of the recorder drive motor and connected to a third one of said timer switches to control supply of power to the recorder drive motor; and circuit means connecting the first relay means to a fourth one of said timer switches to de-energize the first relay and restore it to its normal position after a predetermined cycle of operation.

7. In an attachment for an electrical voice recorder adapted to utilize the recorder for automatically recording telephone messages, the recorder having input and output connections and a drive motor, the combination comprising: a first relay means normally connected conductively to a telephone circuit and responsive to an impulse in the ringing circuit of the telephone to connect the attachment to the voice circuit of the telephone to place the attachment in operation; a timer assembly for controlling operation of the attachment and recorder and including a plurality of separate switches, and motor means individually engaging the switches to operate the switches individually at predetermined times; a reversible motor electrically connected in series to one of said timer switches to be started and stopped by operation of said one switch; circuit means connecting the field of the reversible motor to a second one of said timer switches to effect reversal of said motor by operation of the second switch; and a second relay means electrically connected to a third one of said timer switches and located in the power supply of the recorder drive motor to start and stop the recorder drive motor, said second relay means also controlling operation of a switch for connecting the recorder input to the voice circuit of the telephone for recording an incoming telephone message in the recorder.

8. In an attachment for an electrical voice recorder adapted to utilize the recorder for automatically recording telephone messages, the combination comprising: relay means conductively connected to the ringing circuit of a telephone and responsive to an impulse in said ringing circuit to connect the attachment electrically to the voice carrying circuit of the telephone, said relay means including an operating coil connected in series with the ringing circuit, a switch actuated by said coil and connected in series with a power supply circuit, mechanical latch means for holding said switch closed, a release coil for releasing said latch means connected in series in the power supply circuit, and a second switch connected in series in the ringing circuit actuated by said latch means.

9. In an attachment for an electrical voice recorder adapted to convert the recorder to part of an automatic telephone answering and message recording system, the combination comprising: relay means conductively connected to the ringing circuit of a telephone and responsive to an impulse in said ringing circuit of the telephone to connect the attachment electrically to the voice carrying circuit of the telephone; an announcement assembly for reproducing a recorded announcement, including a playing head, a wire with an announcement recorded thereon, rotatable drum means on which spaced portions of the wire are wound leaving a loop that passes around the playing head, resilient tensioning means to maintain a substantially constant tension in the loop, and reversible drive means for rotating the drum means; and circuit means connecting the playing head through the recorder to the voice circuit of the telephone to transmit the announcement over the voice circuit.

10. In an attachment for an electrical voice recorder adapted to convert the recorder to part of an automatic telephone answering and message recording system, the combination comprising: relay means conductively connected to the ringing circuit of a telephone and responsive to an impulse in said ringing circuit of the telephone to connect the attachment electrically to the voice carrying circuit of the telephone; an announcement assembly for reproducing a recorded announcement, including a playing head, a wire with an announcement recorded thereon, rotatable drum means on which spaced portions of the wire are jumble wound leaving an intermediate loop that passes around the playing head, a wire guide engaging the loop to provide two runs at an angle to each other, a pivoted mount for the wire guide, a spring biasing the mount in a direction to place the loop under tension yet allowing one of said runs to vary in length, and reversible drive means for rotating the drum means; and circuit means connecting the playing head through the recorder to the voice circuit of the telephone to transmit the announcement over the voice circuit.

11. In an attachment for an electrical voice recorder adapted to combine with the recorder to provide an automatic telephone answering system, the recorder having input and output connections, the combination comprising: a master relay means conductively connected to the ringing circuit of a telephone and responsive to an electrical impulse in the ringing circuit to connect the attachment electrically to the voice carrying circuit; means for reproducing a recorded announcement; first circuit means including a second relay means in parallel with the master relay means and energized by actuation of the master relay to connect the recorder output connections to the voice circuit of the telephone; and second circuit means connecting the reproducing means to the recorder input to transmit a recorded message through the recorder and over said first circuit means to the voice circuit of the telephone.

12. In an attachment for an electrical voice recorder adapted to combine with the recorder to provide an automatic telephone answering and message recording system, the recorder having input and output connections and an electrical drive motor, the combination comprising: a first relay means conductively connected to the ringing circuit of a telephone and responsive to an electrical impulse in the ringing circuit to connect the attachment electrically to the voice carrying circuit; means for reproducing a recorded announcement; first circuit means, including a second relay means in parallel with the first relay means and energized by actuation of the first relay, to connect selectively the recorder input and output connections to the voice circuit of the telephone; second circuit means connecting the reproducing means to the recorder input to transmit a recorded message through the recorder and from the recorder output over the first circuit to the voice circuit of the telephone; a third relay means operating a switch in both of the first and second circuit means to disconnect the reproducing means from the recorder input and connect the telephone voice circuit to the recorder input to receive an incoming message in the recorder; and a fourth relay in parallel with the first and second relays and energized by actuation of the first relay to complete a power supply circuit to the recorder drive motor to operate the recording mechanism.

13. In an attachment for an electrical voice recorder adapted to be combined with the recorder to form an automatic telephone answering system, the combination comprising: a first relay conductively connected to the ringing circuit and actuated in response to the ringing current; an announcement assembly; a second relay; circuit means including and controlled by the second relay for connecting the announcement assembly to the voice carrying circuit of the telephone; means interconnecting the first and second relays actuating the second relay in response to the first relay; a normally closed switch in series with the first relay and opened by actuation of the second relay to de-energize the first relay; and motor driven timing means for de-energizing the second relay after a predetermined interval of time to break the connection of the voice carrying circuit and to allow said normally closed switch to return to closed position and thereby re-connect the first relay to the ringing circuit of the telephone.

14. In an attachment for use with an electrical voice recorder to provide an automatic telephone answering and message recording system for use in conjunction with a telephone instrument, the combination comprising: a first electric relay means conductively connected to the ringing circuit of the telephone in parallel therewith and actuated directly by the ringing current; an announcement assembly; a second electrical relay means; circuit means including the second relay means for immediately connecting the announcement assembly in operative relation to the voice carrying circuit of the telephone in parallel therewith; and means interconnecting the first relay means and the second relay means rendering the second relay means responsive to the first relay means to electrically connect the announcement assembly to the voice carrying circuit after actuation of the first relay means.

15. The combination as in claim 14 that also includes a message recording assembly in the recorder; circuit means including multiple position switch means making direct electrical connections alternately of the announcement assembly and the recording assembly to said voice carrying circuit; and motor driven switch operating means actuating said multiple position switch means at a predetermined time after connection of the announcement assembly to the voice carrying circuit to break said connection.

References Cited in the file of this patent

UNITED STATES PATENTS

| | | |
|---|---|---|
| 745,342 | Freese et al. | Dec. 1, 1903 |
| 1,116,541 | Johnson | Nov. 10, 1914 |
| 1,560,226 | Fisher | Nov. 3, 1925 |
| 2,005,788 | Keiser | June 25, 1935 |
| 2,063,323 | Mallina | Dec. 8, 1936 |
| 2,080,812 | Fairbanks | May 18, 1937 |
| 2,261,420 | Shively et al. | Nov. 4, 1941 |
| 2,284,173 | Soukup et al. | May 26, 1942 |
| 2,525,763 | Beatty | Oct. 17, 1950 |
| 2,519,568 | Handschin | Aug. 22, 1950 |
| 2,549,548 | Von Zimmermann | Apr. 17, 1951 |
| 2,537,407 | Handschin et al. | Jan. 9, 1951 |
| 2,558,040 | Carter | June 26, 1951 |
| 2,673,241 | Van Deventer et al. | Mar. 23, 1954 |